(12) United States Patent
Gabbard

(10) Patent No.: US 6,411,217 B1
(45) Date of Patent: Jun. 25, 2002

(54) VEHICLE DISABLING SYSTEM

(76) Inventor: Charles H. Gabbard, P.O. Box 7952, Newport Beach, CA (US) 92658

( * ) Notice: Subject to any disclaimer, the term of this patent is extended or adjusted under 35 U.S.C. 154(b) by 0 days.

(21) Appl. No.: 09/517,892

(22) Filed: Mar. 3, 2000

Related U.S. Application Data

(63) Continuation-in-part of application No. 09/159,438, filed on Sep. 24, 1998, now Pat. No. 6,124,805, which is a continuation-in-part of application No. 09/081,473, filed on May 19, 1998, now Pat. No. 6,232,884.

(51) Int. Cl.$^7$ ................................................ G06F 7/04
(52) U.S. Cl. ........................... 340/825.31; 340/425.5; 340/426; 180/287; 307/9.1; 307/10.2
(58) Field of Search ................. 340/825.31, 825.69, 340/825.72, 425.5, 426; 341/176; 180/287; 307/9.1, 10.2

(56) References Cited

U.S. PATENT DOCUMENTS

| | | |
|---|---|---|
| 4,001,822 A | 1/1977 | Sterzer |
| 4,660,528 A | 4/1987 | Buck |
| 4,878,050 A | 10/1989 | Kelley |
| 5,008,661 A | 4/1991 | Raj |
| 5,293,527 A | 3/1994 | Sutton |
| 5,533,589 A | 7/1996 | Critzer |
| 5,588,038 A | 12/1996 | Snyder |
| 5,917,405 A * | 6/1999 | Joao ........................... 340/426 |
| 5,933,075 A * | 8/1999 | Ditson ........................ 180/287 |
| 6,072,248 A * | 6/2000 | Muise et al. ............... 307/10.2 |
| 6,140,939 A * | 10/2000 | Flick ..................... 340/825.31 |

OTHER PUBLICATIONS

Laser Technology Inc. "Beyond a Shadow of A Doubt . . . ", LTI 20–20, four pages No Page #'s.

* cited by examiner

Primary Examiner—Timothy Edwards, Jr.
(74) Attorney, Agent, or Firm—Stetina Brunda Garred & Brucker

(57) ABSTRACT

A vehicle disabling system for terminating operation of a vehicle. The system includes a transmit unit for transmitting a command shutdown message and a command-receiver vehicle unit within the subject vehicle in communication with at least one operational component of the vehicle and capable of shutting down that component to thereby terminate vehicle operation. The transmit unit is operable only by an operator having a pre-authorized biometrics identification that is read, recognized, and confirmed by the transmit unit site prior to system activation. Both the transmit unit and the vehicle unit preferably are in separate communication with the global positioning satellite. With respect to the transmit unit, such satellite communication functions to record all transmit unit usage to thereby maintain and assure proper and appropriate operator use thereof. With respect to the vehicle unit, such satellite communication functions to receive location information of the vehicle both for apprehension purposes and for stolen-vehicle recovery purposes. Use of the system can ensure reduced risk and danger to innocent third parties as well as to law enforcement personnel by essentially eliminating the need for vehicle chases.

18 Claims, 1 Drawing Sheet

VEHICLE DISABLING SYSTEM

RELATED APPLICATIONS

This application is a continuation-in-part application of U.S. patent application Ser. No. 09/159,438, filed Sep. 24, 1998 issued on Sep. 26, 2000 as U.S. Pat. No. 6,124,805, which is a continuation-in-part application of U.S. patent application Ser. No. 09/081,473, filed May 19, 1998 issued on May 15, 2001 as U.S. Pat. No. 6,232,884 B1.

FIELD OF THE INVENTION

This invention relates in general to vehicle security, and in particular to a vehicle disabling system where a transmitter incorporating positive operator identification before being operable transmits a command to a receiver capable of terminating vehicle operation and situated within a vehicle to be so disabled.

BACKGROUND OF THE INVENTION

The use of stolen vehicles in committing crimes and in escaping capture by law enforcement officials represents a major criminal activity in both urban and rural communities. Criminals may use stolen vehicles in the commission of bank, jewelry and retail store robberies, fleeing from arrest or re-arrest after an escape, a hit-and-run accident, and other illegal actions. When such an event occurs and identity of the stolen vehicle is known, police officers who spot the vehicle will give chase to hopefully apprehend the driver and any accompanying passengers. Current statistics show that there are approximately 27,000 vehicle chases in the United States everyday. Unfortunately, such police chases can result in tragic endings when innocent third parties are involved in collisions, shootings, or the like during the chase procedure.

As is expected, the longer a chase takes, the greater are the chances that non-involved parties will become victims of the pursuit. As a result, law enforcement officials may need to terminate chase efforts because of danger to third parties and thus permit criminals to escape apprehension. When such termination is not a viable choice, however, risks continue to accrue until the course of the chase is resolved. In view of the danger and potential injury to innocent third parties because of police chases, it is evident that a need is present for technology that can allow police personnel to apprehend such fleeing criminals without lengthy pursuits. Accordingly, a primary object of the present invention is to provide a vehicle disabling system for terminating operation of a vehicle upon transmission of a command.

Another object of the present invention is to provide such a disabling system whereby the vehicle has a command receiver in communication with equipment capable of shutting down engine operation.

Yet another object of the present invention is to provide such a disabling system wherein fuel flow or electrical power to the vehicle engine is terminated to thereby effectuate a shut down.

Yet another object of the present invention is to provide a disabling system wherein a query, command, and command receipt are key-coded using a continuously changing key.

Yet another object of the present invention is to provide a communication link interfacing relevant vehicle theft information as well as monitored vehicle locations as transmitted by the global positioning satellite with the disabling system.

Another object of the present invention is to provide positive operator identification through biometrics wherein a data base storing previously entered biometrics identifications of respective authorized operators compares operator biometrics identification to match operator identification authorization before activating system operability.

These and other objects of the present invention will become apparent throughout the description which now follows.

SUMMARY OF THE INVENTION

The present invention is a vehicle disabling system for terminating operation of a vehicle. The system comprises, first of all, a transmit unit for transmitting a command shutdown message which may preferably be an infrared beam. Second, the system comprises a command-receiver vehicle unit capable of responding to the command and in communication with a transmission receiver situated at an accessible site of the vehicle such that a shutdown message from the transmit unit can reach the vehicle unit. The vehicle unit is in communication with at least one operational component of the vehicle and capable of shutting down that component upon receipt of a shutdown message from the transmit unit to thereby terminate vehicle operation. The transmit unit, which is preferably a hand holdable unit, is operable only by an operator having a pre-authorized biometrics identification read at the transmit unit site, with one example of an easily obtainable biometrics identification being a thumb print. In particular, the transmit unit includes an operator biometrics identifier having access to a data base of respective authorized biometrics stored-identification indicia for a plurality of respective authorized operators. This data base preferably is stored within the transmit unit itself, but optionally can be off-site and accessible via a conventional computer linkage between the transmit unit and a remote location. The transmit unit has a reader of operator biometrics indicia as provided by the proposed operator, a comparator of operator biometrics identification indicia with the stored-identification indicia for matching the operator biometrics identification indicia with the stored-identification indicia and a transmit unit activator for activating the transmit unit only upon a match of operator biometrics identification indicia with stored-identification indicia.

Preferably, the transmit unit initially transmits a query message prior to any shutdown message to confirm potentially accessible vehicle information or to simply confirm the presence of the vehicle disabling system. The vehicle unit is capable of receiving both the query message and the shutdown message and of responding to the query message. When the query response is an expected response, the vehicle unit can substantially immediately react to the shutdown message and accomplish shutdown of the operational component with which it is in communication. In one embodiment, the system can include database access to information about each particular vehicle and/or vehicle owner with respect to registered ownership, insurance coverage, outstanding judicial actions, etc., etc., all accessible as a result of vehicle unit response to the transmit unit query. Such query response can range simply from the vehicle identification number which is thereafter correlated via computer link with stored vehicle information, to a programmable data base within the vehicle unit which can be remotely changed as by telephone input using the standard communication microburst system to provide a direct response.

The query message and the shutdown message of the transmit unit and the query message response of the vehicle unit preferably are encoded with a continuously changing key determined by time of day and an algorithm common to both units. Both the transmit unit and the vehicle unit preferably are in separate communication with the global positioning satellite. In particular, with respect to the transmit unit, such satellite communication functions to record all transmit unit usage and transmit this information to a monitor station to thereby maintain and assure proper and appropriate operator use of the transmit unit. With respect to the vehicle unit, such satellite communication functions to receive location information of the vehicle both for apprehension purposes and for stolen-vehicle recovery purposes. In addition to having the operational components in communication with the vehicle unit for disabling of an already-operating vehicle, the operational components can also be in communication with a keyed ignition switch of the vehicle. In that instance, conventional computer circuitry including a computer chip on the key would shut down the operational components when the key is absent to thereby provide anti-theft functionality.

As is apparent, the disabling system of the present invention provides a safe and efficient manner for law enforcement personnel to apprehend criminals attempting vehicular escape to avoid capture. The system can be incorporated in new vehicles during their production, or it can be retrofitted to vehicles now in operation. Use of the system can ensure reduced risk and danger to innocent third parties as well as to law enforcement personnel by essentially eliminating the need for vehicle chases.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
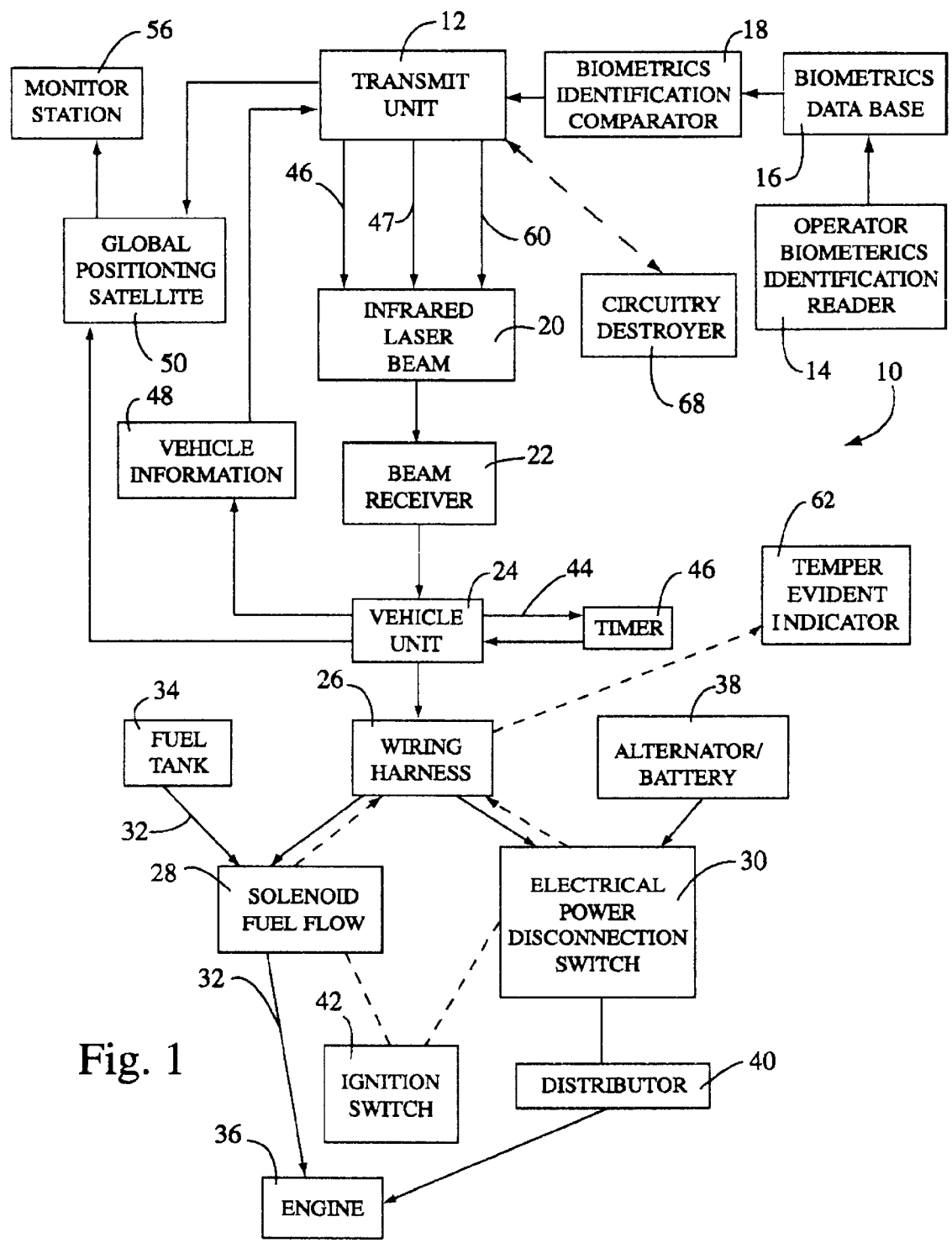
FIG. 1 is a flow diagram of a vehicle disabling system for terminating operation of a vehicle.

FIG. 1 illustrates a vehicle disabling system 10 operable only upon positive identification of an authorized operator. In particular, the system 10 has a preferably hand holdable transmit unit 12 including an operator biometrics identification reader 14, a data base 16 of stored authorized biometrics identifications, an identification comparator 18 for comparing and matching would-be operator biometrics identification with stored authorized biometrics identifications and for activating transmit unit operability upon a positive match, and a transmittable infrared laser beam 20. The preferred biometrics identification is a thumb print provided by the would-be operator to the reader 14. A preferred reader 14 is that available from Who Vision of Irvine, Calif. under the trademark TACTILESENSE. Once the thumb print is received, it is transferred to the data base 16 preferably situated within the transmit unit 12 and a conventional data base positive-match search of stored pre-authorized thumb prints occurs. Once a positive thumb print match within the data base 16 is achieved, which of course indicates that the would-be operator is authorized to operate the system 10, the transmit unit 12 becomes activated and is capable of transmitting the laser beam 20. As a further safeguard against unauthorized use of the transmit unit 12, the interior thereof can be provided with a circuitry destroyer 68 with circuit destruction capabilities. Such a destroyer 68 is non-limitedly exemplified in a recognized alliance of a capacitor and a strong-acid filled vial whose housing melts because of capacitor heating upon transmit-unit tampering that conventionally causes capacitor activation to thereby release the strong acid, which non-limitedly can be concentrated hydrochloric acid, sulfuric acid, nitric acid, or the like, which subsequently melts transmit-unit circuitry wiring.

Infrared laser beam transmittal is preferably in a relatively narrow width of about three feet over a distance of at least about one-half mile, and can be achieved by conventionally available transmitters such as that manufactured by Laser Technology, Inc., Englewood, Colo. Model LTI 20-20. Mounted at a preferably plurality of exterior sites of a vehicle are respective beam receivers 22 to which the laser beam 20 can be aimed. Vehicle placement of beam receivers 22 is relatively unlimited, and can include window sites, roof and body panel sites, lights, etc., with the primary objective for receiver placement being to assure a choice of several laser beam targets with which the transmit unit 12 can be associatedly aimed. As is known in the art, such receivers 22 can be relatively small and generally non-obtrusive. The receivers 22 are in conventional communication with a vehicle unit 24 disposed within the vehicle and preferably relatively hidden or otherwise not easily accessible to thereby deter attempted tampering. The vehicle unit 24 is in communication via a wiring harness 26 with both a closable solenoid fuel flow valve 28 and an electrical power disconnection switch 30, both as known in the art. The valve 28 is situated in a fuel line 32 leading from a fuel tank 34 to the vehicle engine 36, and preferably has a reset button located someplace within the vehicle such as in the trunk compartment. The vehicle unit 24 also preferably has an integral reset circuit 44 leading to a conventional timer 46 to thereby automatically reset and thus deactivate shutdown after a preset time as, for example, 20 minutes. The power disconnection switch 30 is disposed between the power source 38, generally an alternator and battery, and a conventional distributor 40 found in most engines. While the preferred embodiment includes a connection from the vehicle unit 24 to both a fuel flow valve 28 and a power disconnection switch 30, it is not necessary to have or include both of these operational components. Instead, only one or the other of the valve 28 and switch 30 can be in communication with the vehicle unit 24. Further, in a retrofit situation where a vehicle owner wishes to add the disabling system, addition of a fuel flow valve 28 is relatively easily performed. A tamper-evident indicator 62 can be provided in communication with the valve 28 and switch 30 via the harness 26. The indicator 62 can be, for example, a white or colored light on the exterior of the vehicle, and could even be a pre-existing back-up light, that remains illuminated to thereby draw attention to an unusual event. If attempted or actual disengagement of the valve 28 or switch 30 occurs, the indicator is permanently activated to thereby alert passers-by as well as law enforcement personnel of the presence of tampering and a probable security breach. In addition to being in communication with the vehicle unit 24, the valve 28 and switch 30 can be in communication with the keyed ignition switch 42 of the vehicle. A key (not shown) having a computer chip therewith is provided to complete a circuit as known in the art such that absence of a key results in a shut down of both the valve 28 and switch 30. When such communication is provided, the disabling system 10 additionally functions as an anti-theft system.

The transmit unit 12 and vehicle unit 24 can be provided with standard handshake encoding. In particular, the encoding system is constructed with circuitry as known in the art to provide a continuously changing coded key common to both the transmit unit 12 and the vehicle unit 24. This code is determined by time of day and an algorithm substantially identically operable in both the transmit unit 12 and the vehicle unit 24, with the time of day acceptable range being plus or minus one hour to thereby compensate for expected non-exact time settings. The transmit unit 12 transmits an encoded query message 46 to which the vehicle unit 24 responds with an encoded stream of vehicle identification information 48 which can include the vehicle identification number, vehicle owner identity, and the like. Depending upon the degree of present technology incorporated into the vehicle unit 24, the unit 24 can additionally relate earlier-loaded information, which can be remotely loaded by telephone connection thereto, concerning insurance coverage, previous vehicle-owner offenses, and the like. This information can be transmitted by radio signal from the vehicle unit 24 within which it is stored for such transmittal to the transmit unit 12 which is, of course, capable of receiving such radio signals in a conventional manner as known in the art. Upon receipt of the transmitted information, the operator of the transmit unit 12 can send a shutdown message 47 to the vehicle unit 24 as appropriate. Message transmission from the transmit unit 12 is vehicle specific, meaning that one transmit-unit activation can disable only one vehicle as opposed to a plurality of vehicles at once. Thus, a separate activation is required for each disablement. On the unlikely chance that an incorrect vehicle is accidently disabled because of mis-aiming or otherwise, the transmit unit 12 is provided with the capability to transmit a reset message 60 to the vehicle unit 24 of such incorrect vehicle to thereby re-establish vehicle operation.

The vehicle disabling system 10 additionally includes communication capabilities through a global positioning satellite 50 leading to a monitor station 56. Both the transmit unit 12 and the vehicle unit 24 preferably are in separate communication with the global positioning satellite. With respect to the transmit unit 12, such satellite communication functions to record all transmit unit usage and send this information to the monitor station 56 to thereby maintain and assure proper and appropriate operator use of the transmit unit 12. With respect to the vehicle unit 24, such satellite communication functions to receive and convey location information of the vehicle both for apprehension purposes and for stolen-vehicle recovery purposes.

Operability of the vehicle disabling system 10 is initiated when an operator places his thumb on the biometrics identification reader 14 and operator authorization is thereafter established as described above. Once the transmit unit 12 is so activated, the operator aims the transmit unit 12 such that the laser beam 14 strikes a beam receiver 22 to thereby deliver a query message to the vehicle unit 24 of a subject vehicle and establishes a handshake there between. Depending upon the response message from the vehicle unit 24 and the purpose of the query, the operator has a choice of proceeding no further (e.g. if ownership, insurance information, etc. is proper and no other action is indicated), or of sending a shutdown message and disabling the vehicle as described above.

As is thus apparent, the present invention provides a vehicle apprehension and recovery method that is effective without requiring substantial risk because of high speed or otherwise dangerous vehicular pursuits that are, in essence, stopped before they begin. Benefits inherent in the invention therefore include safety for persons in the proximity of an apprehension site, property preservation since destructive activity caused by speeding vehicles is precluded, and return of stolen vehicles to rightful owners without high repair expenses which are reflected in insurance costs. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A vehicle disabling system for terminating operation of a vehicle, the system comprising:
   a) hand holdable transmit unit operable only by an operator having a pre-authorized biometrics identification for transmitting a shutdown message, said transmit unit additionally comprising an operator biometrics identifier having access to a data base of respective authorized biometrics stored-identification indicia for a plurality of respective authorized operators, a reader of operator biometrics indicia provided by said operator, a comparator of operator biometrics identification indicia with said stored-identification indicia for matching said operator biometrics identification indicia with said stored-identification indicia, and a transmit unit activator for activating the transmit unit only upon a match of operator biometrics identification indicia with stored-identification indicia; and
   b) a vehicle unit for receiving the shutdown message, with said vehicle unit being in communication with at least one operational component of the vehicle for shutting down said component upon receipt of the shutdown message from the transmit unit to thereby terminate vehicle operation, said operational component being in communication with a visually observable tamper-evident indicator disposed at an external site of the vehicle whereby tampering with the operational component activates the indicator for drawing attention to the vehicle.

2. A vehicle disabling system as claimed in claim 1 wherein the biometrics identification is a thumb print.

3. A vehicle disabling system as claimed in claim 1 wherein the transmit unit thereof additionally comprises a reset message transmittable to the vehicle unit for reversal of a pre-transmitted shutdown message.

4. A vehicle disabling system as claimed in claim 1 wherein the system additionally comprises a communication linkage communicable with a global positioning satellite for sending a usage record of the transmit unit and a remote receiver in communication with the global positioning satellite for receiving said usage record.

5. A vehicle disabling system as claimed in claim 1 wherein said respective authorized biometrics stored-identification indicia is stored in the transmit unit.

6. A vehicle disabling system as claimed in claim 1 wherein the transmit unit thereof additionally comprises a circuitry destroyer for destroying operational circuitry within the transmit unit and activateable upon attempted tampering with said circuitry.

7. A vehicle disabling system as claimed in claim 1 wherein transmissions and responses between the transmit unit and the vehicle unit-are encoded with a continuously changing key determined by time of day and an algorithm common to the query message, shutdown message and query message response.

8. A vehicle disabling system of terminating operation of a vehicle, the system comprising:
   a) a transmit unit operable only by an operator having a pre-authorized biometrics identification for transmitting a query message and a shutdown message and for receiving a response to the query message, said transmit unit additionally comprising an operator biometrics identifier having access to a data base of respective authorized biometrics stored-identification indicia for a plurality of respective authorized operators, a reader of operator biometrics indicia provided by said operator, a comparator of operator biometrics identification indicia with said stored-identification indicia for matching said operator biometrics identification indicia with said stored-identification indicia, and a transmit unit activator for activating the transmit unit only upon a match of operator biometrics identification indicia with stored-identification indicia; and b) a vehicle unit for receiving the query message and the shutdown message and for providing a query message response activated and generated by the vehicle unit, with said vehicle unit being in communication with at least one operational component of the vehicle for shutting down said component upon receipt of a shutdown message from the transmit unit to thereby terminate vehicle operation, said operational component being in communication with a visually observable tamper-evident indicator disposed at an external site of the vehicle whereby tampering with the operational component activates the indicator for drawing attention to the vehicle.

9. A vehicle disabling system as claimed in claim 8 wherein the biometrics identification is a thumb print.

10. A vehicle disabling system as claimed in claim 8 wherein the transmit unit thereof additionally comprises a reset message transmittable to the vehicle unit for reversal of a pre-transmitted shutdown message.

11. A vehicle disabling system as claimed in claim 8 wherein the system additionally comprises a communication linkage communicable with a global positioning satellite for sending a usage record of the transmit unit and a remote receiver in communication with the global positioning satellite for receiving said usage record.

12. A vehicle disabling system as claimed in claim 8 wherein said respective authorized biometrics stored-identification indicia is stored in the transmit unit.

13. A vehicle disabling system as claimed in claim 8 wherein the transmit unit thereof additionally comprises a circuitry destroyer for destroying operational circuitry within the transmit unit and activateable upon attempted tampering with said circuitry.

14. A vehicle disabling system as claimed in claim 8 wherein transmissions and responses between the transmit unit and the vehicle unit are encoded with a continuously changing key determined by time of day and an algorithm common to the query message, shutdown message and query message response.

15. A vehicle disabling system for terminating operation of a vehicle, the system comprising:

a) hand holdable transmit unit operable only by an operator having a pre-authorized biometrics identification for transmitting a shutdown message, said transmit unit additionally comprising an operator biometrics identifier having access to a data base of respective authorized biometrics stored-identification indicia for a plurality of respective authorized operators, a reader of operator biometrics indicia provided by said operator, a comparator of operator biometrics identification indicia with said stored-identification indicia for matching said operator biometrics identification indicia with said stored-identification indicia, and a transmit unit activator for activating the transmit unit only upon a match of operator biometrics identification indicia with stored-identification indicia;

b) a vehicle unit for receiving the shutdown message, with said vehicle unit being in communication with at least one operational component of the vehicle for shutting down said component upon receipt of the shutdown message from the transmit unit to thereby terminate vehicle operation; and c) a communication linkage communicable with a global positioning satellite for sending a usage record of the transmit unit and a remote receiver in communication with the global positioning satellite for receiving said usage record.

16. A vehicle disabling system for terminating operation of a vehicle, the system comprising:

a) hand holdable transmit unit operable only by an operator having a pre-authorized biometrics identification for transmitting a shutdown message, said transmit unit additionally comprising an operator biometrics identifier having access to a data base of respective authorized biometrics stored-identification indicia for a plurality of respective authorized operators, a reader of operator biometrics indicia provided by said operator, a comparator of operator biometrics identification indicia with said stored-identification indicia for matching said operator biometrics identification indicia with said stored-identification indicia, a transmit unit activator for activating the transmit unit only upon a match of operator biometrics identification indicia with stored-identification indicia, and a circuitry destroyer for destroying operational circuitry within the transmit unit and activateable upon attempted tampering with said circuitry; and b) a vehicle unit for receiving the shutdown message, with said vehicle unit being in communication with at least one operational component of the vehicle for shutting down said component upon receipt of the shutdown message from the transmit unit to thereby terminate vehicle operation.

17. A vehicle disabling system of terminating operation of a vehicle, the system comprising:

a) a transmit unit operable only by an operator having a pre-authorized biometrics identification for transmitting a query message and a shutdown message and for receiving a response to the query message, said transmit unit additionally comprising an operator biometrics identifier having access to a data base of respective authorized biometrics stored-identification indicia for a plurality of respective authorized operators, a reader of operator biometrics indicia provided by said operator, a comparator of operator biometrics identification indicia with said stored-identification indicia for matching said operator biometrics identification indicia with said stored-identification indicia, and a transmit unit activator for activating the transmit unit only upon a match of operator biometrics identification indicia with stored-identification indicia;

b) a vehicle unit for receiving the query message and the shutdown message and for providing a query message response activated and generated by the vehicle unit, with said vehicle unit being in communication with at least one operational component of the vehicle for shutting down said component upon receipt of a shutdown message from the transmit unit to thereby terminate vehicle operation; and c) a communication linkage communicable with a global positioning satellite for sending a usage record of the transmit unit and a remote receiver in communication with the global positioning satellite for receiving said usage record.

18. A vehicle disabling system of terminating operation of a vehicle, the system comprising:
 a) a transmit unit operable only by an operator having a pre-authorized biometrics identification for transmitting a query message and a shutdown message and for receiving a response to the query message, said transmit unit additionally comprising an operator biometrics identifier having access to a data base of respective authorized biometrics stored-identification indicia for a plurality of respective authorized operators, a reader of operator biometrics indicia provided by said operator, a comparator of operator biometrics identification indicia with said stored-identification indicia for matching said operator biometrics identification indicia with said stored-identification indicia, a transmit unit activator for activating the transmit unit only upon a match of operator biometrics identification indicia with stored-identification indicia, and a circuitry destroyer for destroying operational circuitry within the transmit unit and activateable upon attempted tampering with said circuitry; and
 b) a vehicle unit for receiving the query message and the shutdown message and for providing a query message response activated and generated by the vehicle unit, with said vehicle unit being in communication with at least one operational component of the vehicle for shutting down said component upon receipt of a shutdown message from the transmit unit to thereby terminate vehicle operation.

* * * * *